United States Patent Office 3,219,613
Patented Nov. 23, 1965

3,219,613
PLASTICIZED POLYVINYL ALCOHOL
Frederick J. Keene, Medford Lakes, N.J., assignor to E. I. du Pont de Nemours and Company, Wilmington, Del., a corporation of Delaware
No Drawing. Filed Mar. 21, 1963, Ser. No. 266,811
2 Claims. (Cl. 260—30.2)

The present invention relates to novel, plasticized polyvinyl alcohol compositions.

Polyvinyl alcohols are used for making water-soluble films for unit packaging of detergents and other laundering aids so that the package can be thrown into the washer.

However, the films of polyvinyl alcohol are not sufficiently strong to contain the detergent during shipment and handling unless they are plasticized. The most commonly used plasticizers for polyvinyl alcohol films are of the humectant type wherein the water absorbed by the humectant is actually the plasticizer. This type of plasticizer, however, allows the film to become brittle under conditions of low humidity. The high absorption of water at high humidities likewise leads to low strength because of excessive water absorption by the film. Such humectants include glycerine, sorbitol, or the like.

The present invention provides compositions of polyvinyl alcohol admixed and plasticized with N-(2-cyanoethyl)caprolactam. In general, the compositions contain from about 5 to about 30% of N-(2-cyanoethyl)caprolactam based on the total weight of polyvinyl alcohol and N-(2-cyanoethyl)caprolactam. The compositions of this invention remain flexible under conditions of both low and high humidity. The preferred compositions contain from about 10 to about 25% N-(2-cyanoethyl)caprolactam.

The term "polyvinyl alcohol" when used herein covers both partially and fully hydrolyzed grades of polyvinyl alcohol. Commercial polyvinyl alcohol is made by the hydrolysis of polyvinyl acetate. If only 85–90% of the acetate groups are removed by hydrolysis, that is, the polymer contains 85 to 90% by weight of

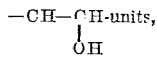

the product is referred to as partially hydrolized whereas if 97% or more of the acetate groups are removed it is called fully hydrolyzed.

The preferred grade of polyvinyl alcohol used in the practice of the present invention is the partially hydrolyzed grade. Partially hydrolyzed polyvinyl alcohol has optimum compatibility with the N-(2-cyanoethyl)caprolactam and compositions of this invention formed therewith have optimum flexibility and show minimum crystallization which, in turn, can lead to brittleness. While I do not wish to be bound by theory, the reason for this preference is probably the greater disorder in the polymeric structure of the partially hydrolyzed grade.

The N-(2-cyanoethyl)caprolactam plasticizer is mixed with the polyvinyl alcohol in any suitable manner. The polyvinyl alcohol can be dissolved in water, the plasticizer added and the water evaporated. The plasticizer can be milled with the polyvinyl alcohol in a three roll or two roll mill to give chips which can later be molded into plastic objects or dissolved in water for casting films. The plasticizer also can be mixed with the polyvinyl alcohol in a suitable mixer such as a sigma blade mixer.

As previously indicated, the quantity of N-(2-cyanoethyl)caprolactam used can vary from about 5% of the total weight of the polyvinyl alcohol and N-(2-cyanoethyl)caprolactam to 30% or higher. Below about 5% the plasticizing action is not sufficiently great to have commercial value and above 30% the polymeric properties of the polyvinyl alcohol are being diluted so that tensile strength of formed objects suffers.

In addition to polyvinyl alcohol and N-(2-cyanoethyl)caprolactam, the plasticized compositions of this invention can contain other ingredients such as insolubilizing agents, extenders, gelling agents, dyes, pigments, wetting agents, antifoaming agents, and other auxiliary plasticizers. The plasticized polyvinyl alcohol, that is, polymer and N-(2-cyanoethyl)caprolactam, usually comprises at least 50% by weight of the compositions of this invention. The quantities of the aforementioned optional additives used vary with the particular additive and the properties necessary in the final product fabricated from the compositions of this invention. Normally, dyes and pigments are used in amounts of up to 10% based on the total weight of composition, while gelling agents, extenders, and auxiliary plasticizers are normally used in amounts of 0 to 30%. Examples of such conventional additives are:

(1) Plasticizers—glycerine, ethylene glycol, hexaethylene glycol, ethanol, acetamide
(2) Gelling agents—resorcinol, gallic acid
(3) Dyes—Congo red, Pontamine orange R
(4) Extenders—urea, starch, dextrin, casein
(5) Insolubiliding agents—titanium lactate, dimethylol urea, melamineformaldehyde, chromic nitrate
(6) Pigments—$TiO_2$, $ZnO$, $Fe_2O_3$, lithopone N-(2-cyanoethyl)caprolactam is prepared by the method described in The Journal of the American Chemical Society, 70, 2115 (1948).

The invention is more thoroughly illustrated with the aid of the following examples. Parts and percentages, where given, are by weight.

Example 1

N-(2-cyanoethyl)caprolactam (at several concentration levels) is dissolved in an aqueous solution of polyvinyl alcohol (90% hydrolyzed). The total concentration of polyvinyl alcohol and plasticizer is 20%. Films are cast from these solutions using a 40 mil doctor blade and air dried until tack free. These air dried films are dried at 105° C. in an oven for 3 hours and then cooled to room temperature in an anhydrous atmosphere. The flexibility of the films is tested by bending 180° and then creasing the fold. The film is considered flexible if it passes this test without cracking, as a comparison similar films are prepared substituting glycerine for the caprolactam derivative. The results are as follows:

| Plasticizer | Concentration (Percent of total PVA +plasticizer) | Flexible |
|---|---|---|
| N-(2-cyanoethyl)caprolactam | 5 | No.[1] |
| Do | 10 | Yes. |
| Do | 15 | Yes. |
| Do | 20 | Yes. |
| Do | 30 | Yes. |
| Glycerine | 5 | No.[2] |
| Do | 10 | No.[2] |
| Do | 15 | Yes. |
| Do | 20 | Yes. |
| Do | 30 | Yes. |

[1] Became flexible after standing in ambient air for 10 minutes.
[2] Remained brittle after four hours in ambient air.

Similar results are obtained when fully hydrolyzed polyvinyl alcohol and N-cyanoethyl)caprolactam are cast into films.

*Example 2*

Polyvinyl alcohol films 1.5 mils in thickness (dry) containing 0 and 20% N-(2-cyanoethyl)caprolactam are cast from aqueous polyvinyl alcohol. The physical properties of the films are determined at 72° F. and 20 and 60% relative humidity. The tests are performed according to ASTM test D638–52T.

The results are as follows:

| N-(2-cyanoethyl) caprolactam, Percent Based on Polyvinyl Alcohol | Relative Humidity (Percent) | Tensile Strength (lb./in.$^2$) | Elongation at Break (Percent) |
| --- | --- | --- | --- |
| 0 | 60 | [1] 6,424 | [1] 91 |
| 20 | 60 | [2] 3,870 | [2] 249 |
| 20 | 20 | [3] 3,505 | [3] 171 |

[1] Average of 4 films.
[2] Average of 3 films.
[3] Average of 8 films.

*Example 3*

Films are cast from an aqueous solution of 90% hydrolyzed polyvinyl alcohol with a 40 mil doctor blade. The total concentration of polyvinyl alcohol plus N-(2-cyanoethyl)caprolactam is 20% in each case. For the plasticized film the quantity of plasticizer is 25% of the weight of polyvinyl alcohol. These films are conditioned at the humidities indicated in the table for at least 24 hours before testing. The tests are performed as in Example 2.

| Plasticizer | Tensile Strength (p.s.i.) | | Elongation at Break (percent) | |
| --- | --- | --- | --- | --- |
| | 20% Relative Humidity | 60% Relative Humidity | 20% Relative Humidity | 60% Relative Humidity |
| None | 10,155 | 2,415 | 1.5 | 145 |
| N-(2-cyanoethyl)caprolactam | 4,930 | 1,720 | 140.0 | 205 |

Many additional modifications will be obvious to those skilled in the art without departing from the inventive concept.

I claim:

1. A composition of matter comprising polyvinyl alcohol admixed with from about 5% to about 30% N-(2-cyanoethyl)caprolactam based on total weight of polyvinyl alcohol and N-(2-cyanoethyl)caprolactam.

2. The composition of claim 1 comprising partially hydrolyzed polyvinyl alcohol and from about 10% to about 25% N-(2-cyanoethyl)caprolactam based on the total weight of polyvinyl alcohol and N-(2-cyanoethyl)caprolactam.

References Cited by the Examiner

UNITED STATES PATENTS 2,550,363 10/1946 Luten _____ 260—30.2
3,000,843 9/1961 Barton et al. _____ 260—30.2

MORRIS LIEBMAN, *Primary Examiner.*